(12) United States Patent
 Sato et al.

(10) Patent No.: US 11,485,262 B2
(45) Date of Patent: Nov. 1, 2022

(54) HEADREST SLEEVE AND HEADREST

(71) Applicant: NHK SPRING CO., LTD., Yokohama (JP)

(72) Inventors: Tomoyuki Sato, Yokohama (JP); Satoru Otsuki, Yokohama (JP); Shohei Hayashi, Yokohama (JP)

(73) Assignee: NHK SPRING CO., LTD., Yokohama (JP)

( * ) Notice: Subject to any disclaimer, the term of this patent is extended or adjusted under 35 U.S.C. 154(b) by 43 days.

(21) Appl. No.: 17/303,589

(22) Filed: Jun. 2, 2021

(65) Prior Publication Data
US 2021/0387555 A1    Dec. 16, 2021

(30) Foreign Application Priority Data

Jun. 10, 2020  (JP) .............................. JP2020-101101

(51) Int. Cl.
| *A47C 7/62* | (2006.01) |
| *B60N 2/64* | (2006.01) |
| *H04R 1/02* | (2006.01) |
| *B60N 2/879* | (2018.01) |
| *B60N 2/80* | (2018.01) |

(52) U.S. Cl.
CPC ............. *B60N 2/879* (2018.02); *H04R 1/025* (2013.01); *B60N 2002/899* (2018.02); *H04R 2499/13* (2013.01)

(58) Field of Classification Search
CPC .............................................. B60R 2011/0017
See application file for complete search history.

(56) References Cited

U.S. PATENT DOCUMENTS

| 7,232,187 | B1 * | 6/2007 | Sundararajan | ......... | B60N 2/865 297/391 |
| 7,878,597 | B2 * | 2/2011 | Bokelmann | ............ | B60N 2/829 297/410 |
| 8,272,696 | B2 * | 9/2012 | Hong | ..................... | B60N 2/829 297/391 |
| 8,376,465 | B2 * | 2/2013 | Veine | ..................... | B60N 2/818 297/410 |
| 8,939,512 | B2 * | 1/2015 | Boes | ...................... | B60N 2/809 297/409 |
| 8,950,815 | B2 * | 2/2015 | Wang | ..................... | B60N 2/815 297/391 |

(Continued)

FOREIGN PATENT DOCUMENTS

JP    2014-125188 A    7/2014

*Primary Examiner* — Shin H Kim
(74) *Attorney, Agent, or Firm* — Knobbe, Martens, Olson & Bear, LLP

(57) ABSTRACT

A headrest sleeve for assembly to a bracket fixed to a stay for supporting a main body of a headrest. The headrest sleeve includes a sleeve body formed in a tubular shape, a collar-shaped flange extending from one end portion of the sleeve body and disposed so as to be capable of contacting the bracket, a bracket-fitting section extending from the flange toward an opposite side from the sleeve body and configured to be capable of being fitted into a fitting hole formed in the lower bracket, and an anchor clip provided at the bracket-fitting section and configured to undergo elastic deformation and elastic recovery during the fitting of the bracket-fitting section into the fitting hole so as to engage with the bracket from an opposite side from the flange.

18 Claims, 18 Drawing Sheets

(56) References Cited

U.S. PATENT DOCUMENTS

| | | | |
|---|---|---|---|
| 9,975,459 B2* | 5/2018 | Takada | H04R 5/023 |
| 10,569,684 B2* | 2/2020 | Fritsch | B29C 65/48 |
| 10,703,241 B2* | 7/2020 | Switalski | B60N 2/818 |
| 10,821,869 B2* | 11/2020 | Jiang | B60N 2/865 |
| 2006/0250017 A1* | 11/2006 | Otto | B60N 2/865 |
| | | | 297/410 |
| 2016/0039320 A1* | 2/2016 | Subat | H04R 1/02 |
| | | | 264/273 |
| 2016/0257227 A1* | 9/2016 | Takada | B60N 2/809 |
| 2017/0106775 A1* | 4/2017 | Takada | H04R 1/2819 |
| 2017/0267137 A1* | 9/2017 | Subat | B60R 11/0217 |
| 2019/0118688 A1* | 4/2019 | Fujikake | B60R 11/0217 |

* cited by examiner

HEADREST SLEEVE AND HEADREST

CROSS-REFERENCE TO RELATED APPLICATION

This application is based on and claims priority under 35 USC 119 from Japanese Patent Application No. 2020-101101 filed on Jun. 10, 2020, the disclosure of which is incorporated by reference herein.

BACKGROUND

Technical Field

The present disclosure relates to a headrest, and in particular to a headrest sleeve through which a wire harness or the like is inserted.

Related Art

Japanese Patent Application Laid-Open (JP-A) No. 2014-125188 discloses a structure for routing a wire harness between a seatback and a headrest of a vehicle seat. The headrest is coupled to the seatback so as to allow height adjustment, and a headrest monitor configuring an electrical device is provided inside the headrest. A tubular harness attachment portion (sleeve) that projects toward a lower side of the headrest is provided at a lower end portion of the headrest monitor. The sleeve is inserted into a tubular cover provided at an upper end portion of the seatback. The sleeve moves up and down relative to the cover as the height of the headrest is adjusted. The wire harness is routed from the inside of the headrest to the inside of the seatback through the inside of the sleeve and the inside of the cover.

SUMMARY

In the above related art, the sleeve for wire harness insertion projects out from the lower end portion of the headrest monitor. However, in other types of headrest, such a sleeve may sometimes be assembled to a bracket that is fixed to a headrest stay. In such cases, for example, a flange formed to an upper end portion of the sleeve may be fastened and fixed to the bracket using plural screws. Such a configuration necessitates a process to fasten the screws, leaving room for improvement from the perspective of facilitating assembly of the sleeve to the bracket.

In consideration of the above circumstances, an object of the present disclosure is to obtain a headrest sleeve and a headrest provided with the headrest sleeve that facilitate assembly to a bracket fixed to a headrest stay.

A first aspect of the present disclosure is a headrest sleeve for assembly to a bracket fixed to a stay for supporting a main body of a headrest. The headrest sleeve includes a sleeve body formed in a tubular shape, a collar-shaped flange extending from one end portion of the sleeve body and disposed so as to be capable of contacting the bracket, a bracket-fitting section extending from the flange toward an opposite side from the sleeve body and configured to be capable of being fitted into a fitting hole formed in the bracket, and an anchor clip provided at the bracket-fitting section and configured to undergo elastic deformation and elastic recovery during the fitting of the bracket-fitting section into the fitting hole so as to engage with the bracket from an opposite side from the flange.

The headrest sleeve of the first aspect is configured to be assembled to the bracket fixed to the stay that supports the main body of the headrest. The headrest sleeve includes the sleeve body that is formed in a tubular shape. The collar-shaped flange extends from the one end portion of the sleeve body. The flange is moreover disposed so as to be capable of contacting the bracket. The bracket-fitting section extends from the flange toward the opposite side from the sleeve body. The bracket-fitting section is configured to be capable of being fitted into the fitting hole formed in the bracket. The bracket-fitting section is provided with the anchor clip. The anchor clip undergoes elastic deformation and elastic recovery during the fitting process so as to engage with the bracket from the opposite side from the flange. Assembly of the headrest sleeve to the bracket is performed in the above manner. This assembly can thus be completed simply by performing the above fitting operation, rendering a screw fastening process unnecessary, and thus facilitating assembly.

A headrest sleeve of a second aspect of the present disclosure is the first aspect, further including a cover-fitting section extending from the sleeve body on an opposite side of the flange from the bracket-fitting section, wherein the cover-fitting section is configured to be capable of fitting together with a set-back section formed in a cover member included in the main body.

In the headrest sleeve of the second aspect, the cover-fitting section extends from the sleeve body on the opposite side of the flange from the bracket-fitting section. The cover-fitting section is capable of fitting together with the set-back section formed in the cover member of the main body of the headrest. The headrest sleeve is thus supported at two locations by the cover member and the bracket, namely through the cover-fitting section and the bracket-fitting section, thereby enabling the support strength provided at the headrest sleeve to be enhanced.

A headrest sleeve of a third aspect of the present disclosure is the second aspect, wherein the cover-fitting section is formed with a groove into which an edge of the set-back section is fitted.

In the headrest sleeve of the third aspect, the edge of the set-back section in the cover member of the headrest is fitted into the groove formed in the cover-fitting section. This enables the cover-fitting section to be securely supported with respect to the cover member.

A headrest sleeve of a fourth aspect of the present disclosure is the third aspect, wherein the groove is formed in a tapering shape such that a groove width of the groove gradually decreases on progression toward a back side of the groove in a fitting direction of the edge of the set-back section.

In the headrest sleeve of the fourth aspect, the groove formed in the cover-fitting section is formed in a tapering shape such that the groove width of the groove gradually decreases on progression toward the back side of the groove in the fitting direction of the edge of the set-back section of the cover member. This enables play between the groove (i.e. the cover-fitting section) and the edge of the set-back section to be reduced or eliminated.

A headrest sleeve of a fifth aspect of the present disclosure is the second aspect, wherein the main body includes another cover member that is supported by the stay, and the cover member is coupled to the other cover member by plural coupling sections arranged inside the headrest, and the cover-fitting section is fitted together with the set-back section during the coupling.

In the headrest sleeve of the fifth aspect, the cover-fitting section is fitted together with the set-back section in the cover member during coupling of the cover member of the main body of the headrest to the other cover member supported by the headrest stay. The cover member and the other cover member are coupled together by the plural coupling sections arranged inside the headrest. Although this coupling operation is performed under circumstances in which the plural coupling sections are difficult to see, the cover member and the other cover member are positioned with respect to each other as the cover-fitting section and the set-back section in the cover member are being fitted together. This enables the coupling of the plural coupling sections to be guided, thereby facilitating the coupling operation.

A headrest sleeve of a sixth aspect of the present disclosure is the second aspect, wherein the main body includes another cover member that is supported by the stay and to which the cover member is coupled, and a covering material that is laid over the other cover member, and the cover-fitting section includes a concealing portion that hides part of a seam between the covering material and the cover member.

In the headrest sleeve of the sixth aspect, the cover-fitting section fitted together with the set-back section in the cover member of the main body of the headrest includes the concealing portion. The concealing portion conceals part of the seam between the cover member and the covering material laid over the other cover member to which the cover member is coupled. This enables a high quality finish to be obtained at the seam.

A headrest of a seventh aspect of the present disclosure includes a stay to which a bracket is fixed, a main body supported by the stay, and the headrest sleeve of the first aspect assembled to the bracket.

In the headrest of the seventh aspect, the bracket is fixed to the stay that supports the main body. The headrest sleeve is assembled to the bracket. The headrest sleeve is that described in the first aspect. Accordingly, similar operation and advantageous effects to those of the first aspect are obtained.

As described above, the headrest sleeve and headrest according to the present disclosure facilitate assembly to a bracket fixed to a headrest stay.

BRIEF DESCRIPTION OF THE DRAWINGS

Exemplary embodiments of the present disclosure will be described in detail based on the following figures, wherein.

DETAILED DESCRIPTION

Figure 1:
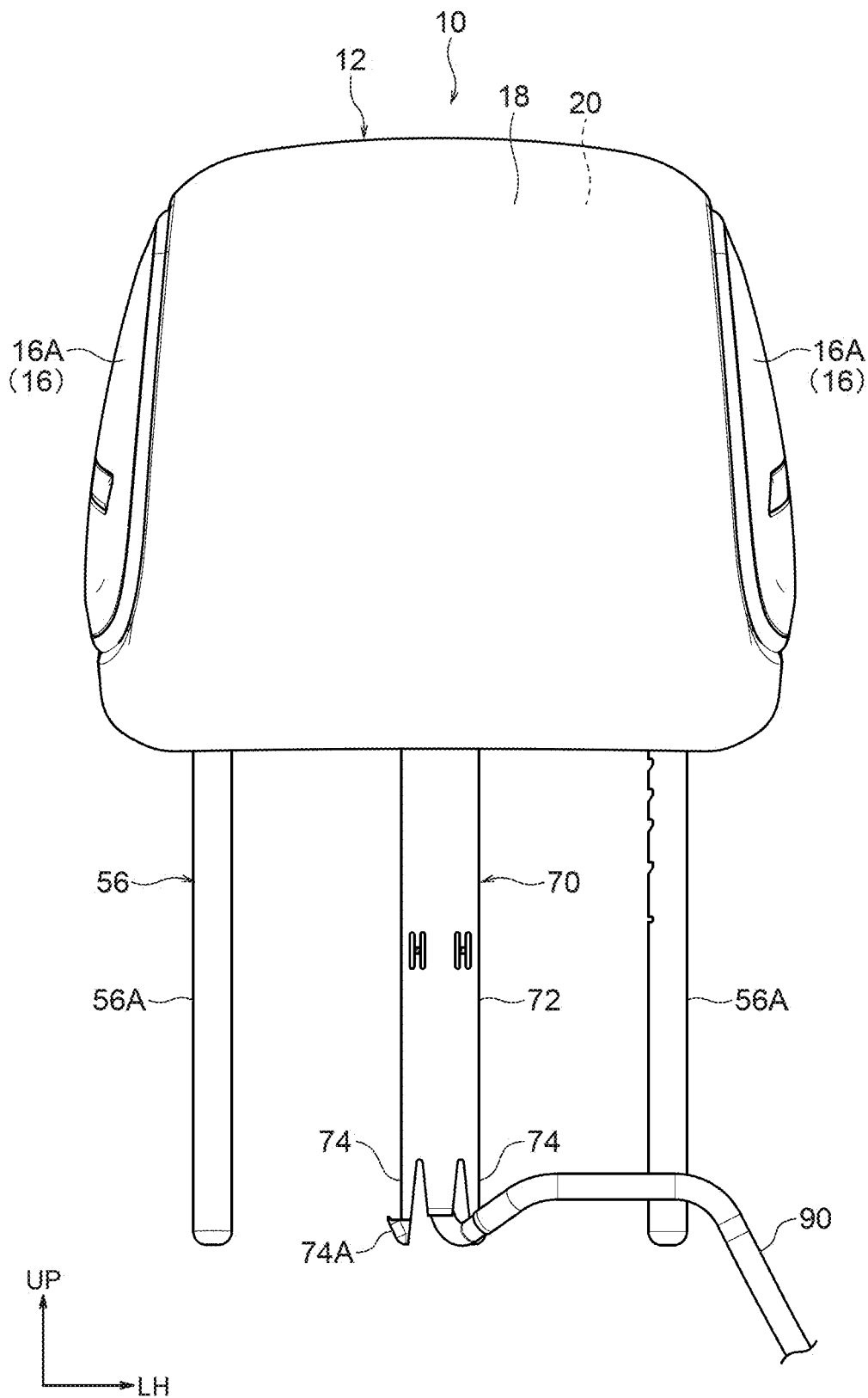
FIG. 1 is a front view illustrating a headrest according to an exemplary embodiment.

Explanation follows regarding a headrest 10 according to an exemplary embodiment of the present disclosure, with reference to FIG. 1 to FIG. 18. Note that some reference numerals may be omitted from the drawings in order to facilitate understanding of the drawings. In the drawings, the arrow FR, the arrow LH, and the arrow UP respectively indicate a front side, a left side, and an upper side of the headrest 10. Hereafter, reference to front-rear, left-right, and up-down directions refers to these directions relative to the headrest 10.

Configuration

Figure 2:
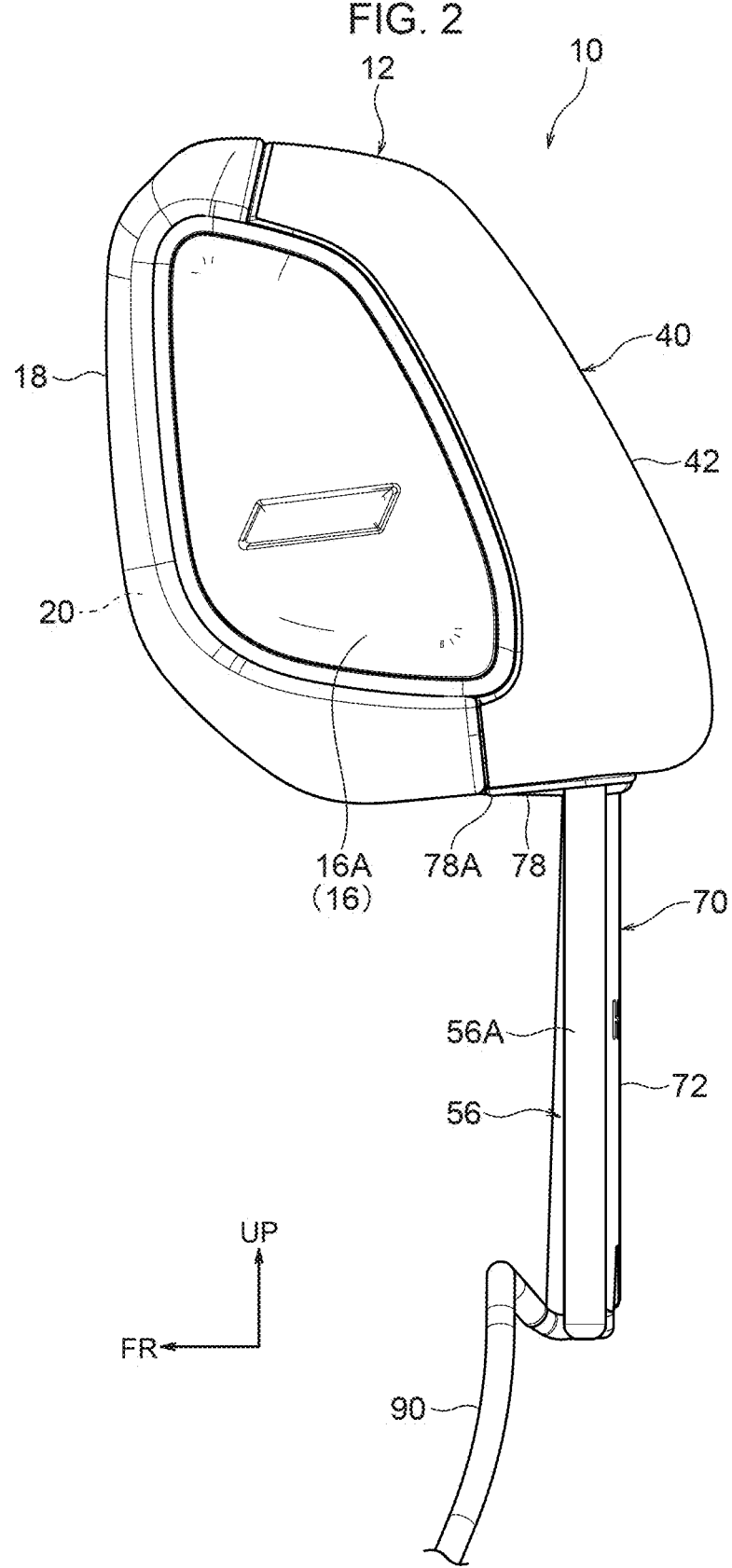
FIG. 2 is a side view illustrating a headrest according to an exemplary embodiment.
Figure 3:
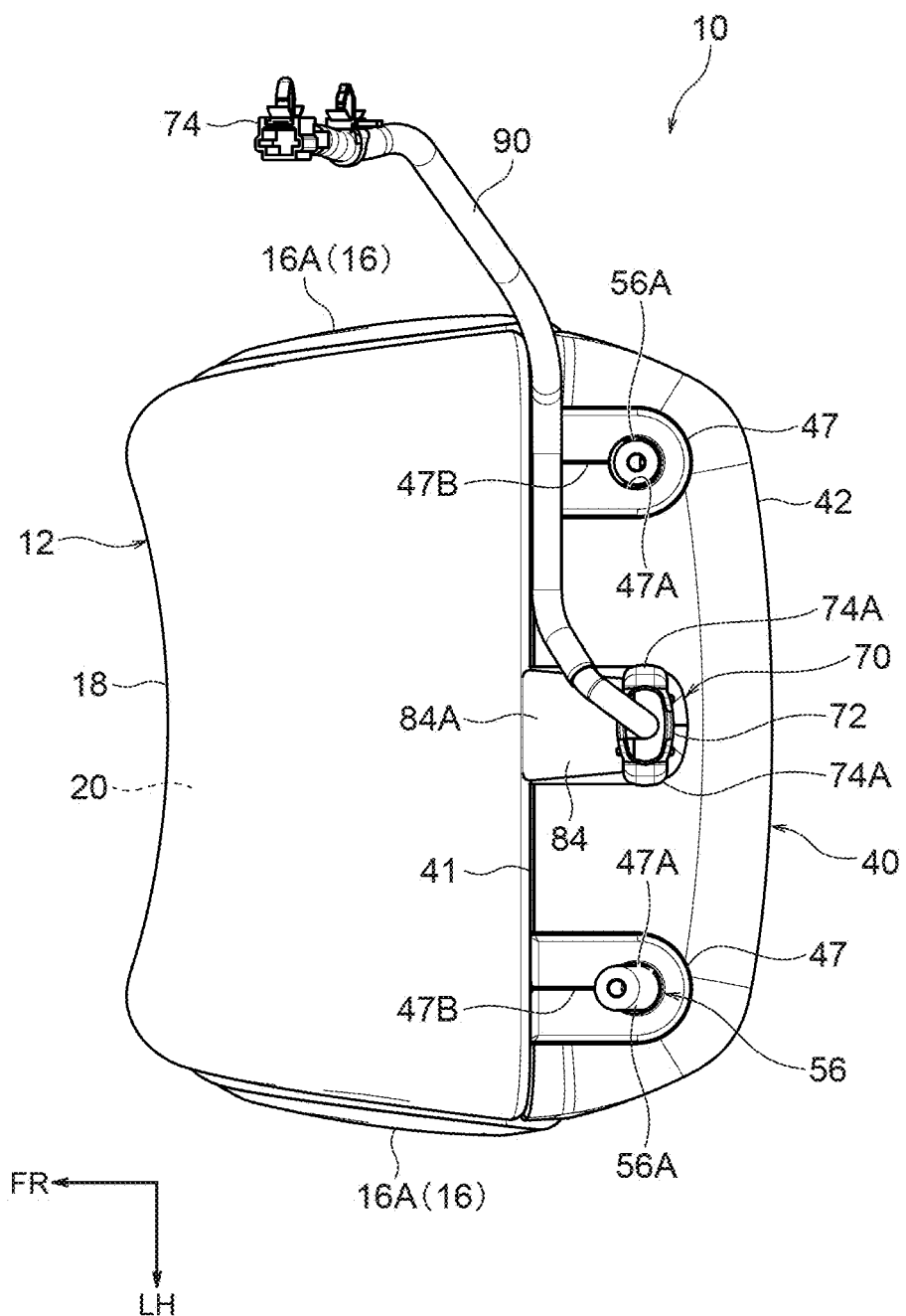
FIG. 3 is a lower face view illustrating a headrest according to an exemplary embodiment.
Figure 4:
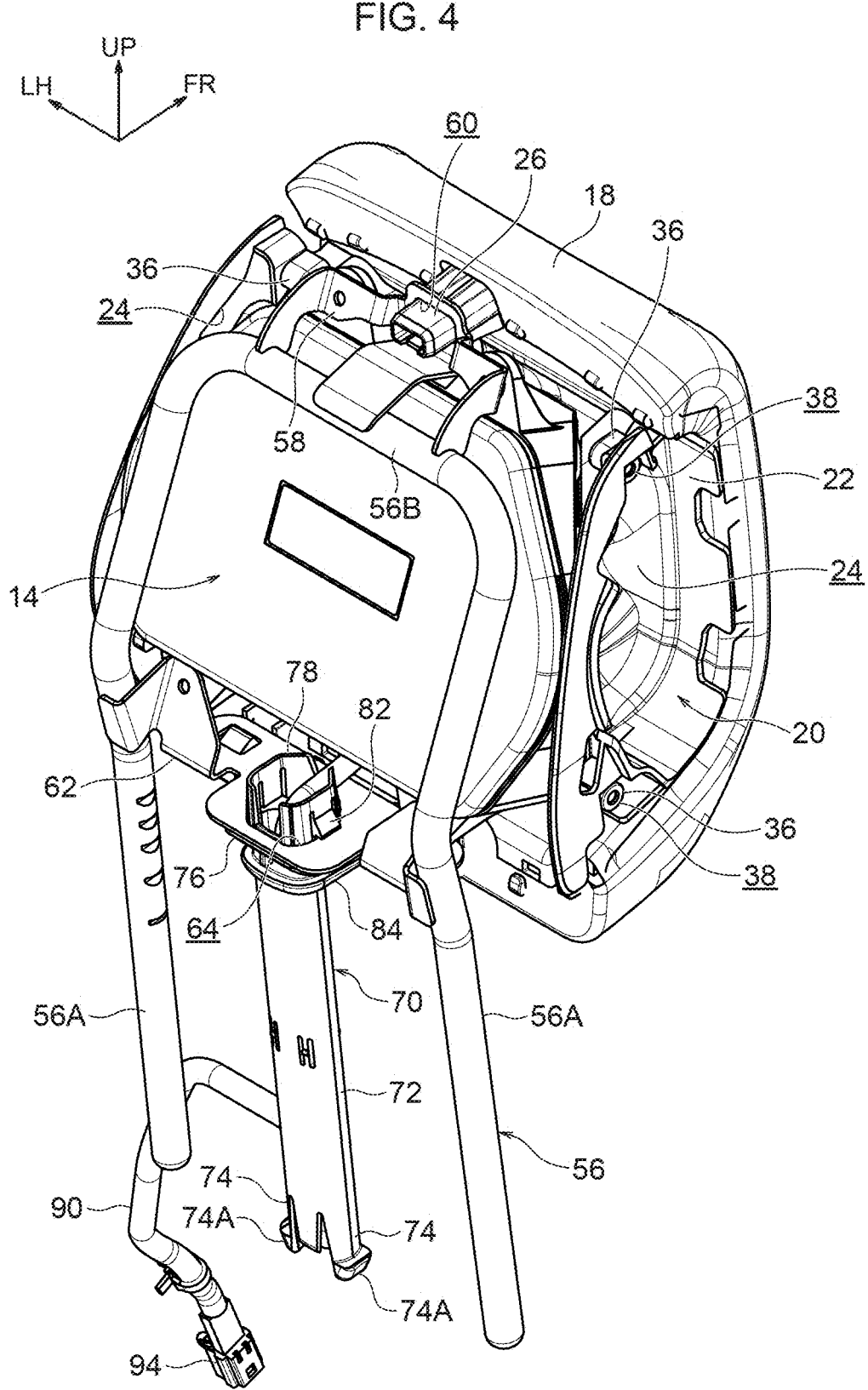
FIG. 4 is a perspective view illustrating a headrest according to an exemplary embodiment in a state in which a rear cover has been removed.

As illustrated in FIG. 1 to FIG. 3, the headrest 10 according to the present exemplary embodiment includes a main body 12, a stay 56, a sleeve 70, and a wire harness 90. The sleeve 70 corresponds to a "headrest sleeve" of the present disclosure. As an example, the headrest 10 is coupled to an upper end portion of a seatback of a non-illustrated vehicle seat so as to support the head of an occupant. As illustrated in FIG. 4, an audio unit 14, this being an electrical device, is built into the main body 12 of the headrest 10. The audio unit 14 includes a left and right pair of speakers 16. The left and right speakers 16 are configured including left and right speaker covers 16A (see FIG. 1 to FIG. 3) that are attached to respective left and right end portions of the main body 12.

The main body 12 has a front styling face configured by a trim 18, a rear styling face configured by a rear cover 40, and respective left and right styling faces configured by the left and right speaker covers 16A. The trim 18 is laid over a front cover 20 that is supported by the stay 56. The front cover 20 is disposed in front of the stay 56, and is fixed to an upper bracket 58 and a lower bracket 62 that are fixed to the stay 56. The audio unit 14 is assembled to the front cover 20. A front face of the front cover 20 is hidden by the trim 18, and a non-illustrated padding material is interposed between the trim 18 and the front cover 20. The rear cover 40 is disposed behind the stay 56, and is coupled to the front cover 20. The rear cover 40 is thereby supported by the stay 56 through the front cover 20.

Figure 9:
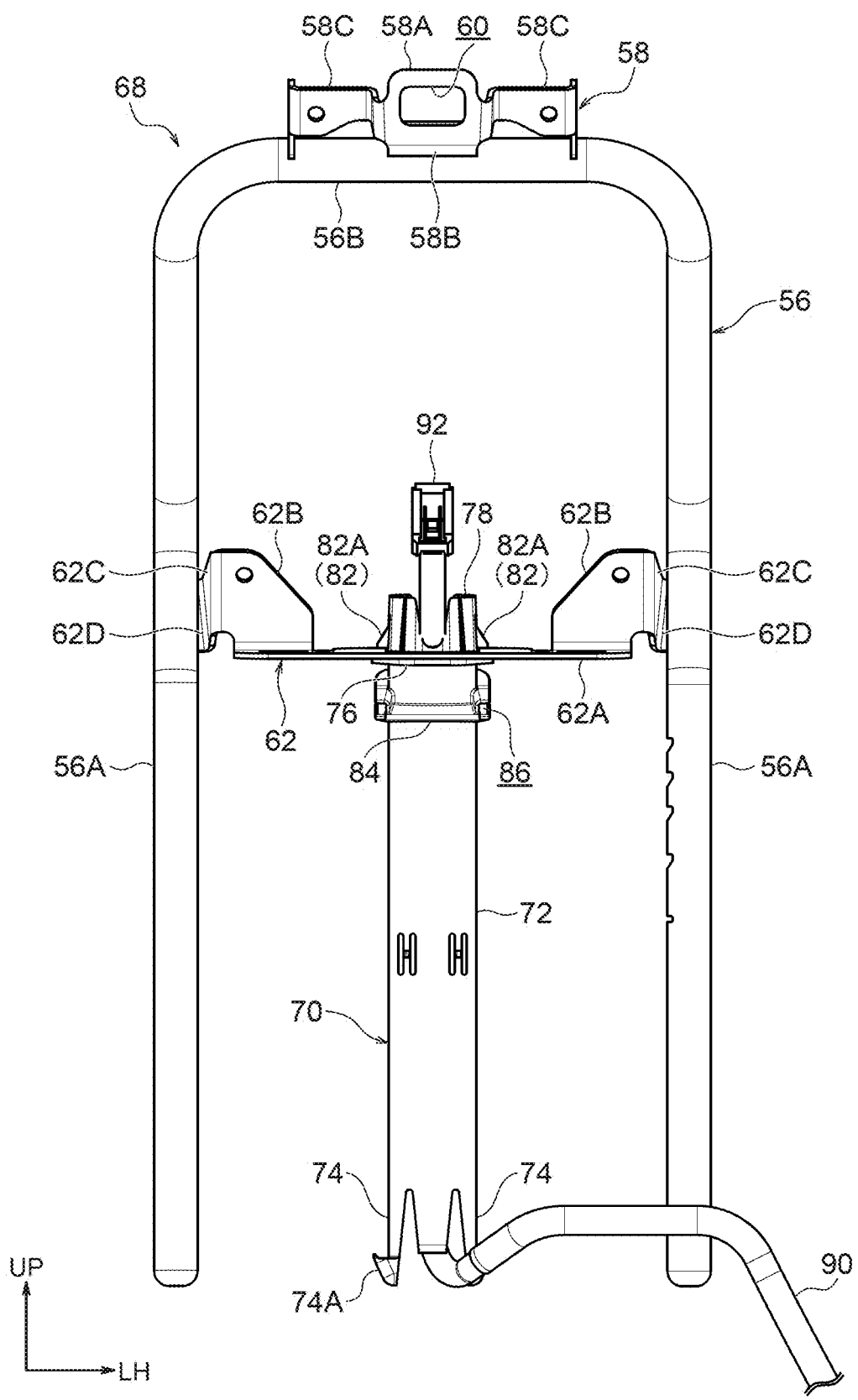
FIG. 9 is a front view illustrating a state in which a sleeve and a harness have been assembled to a stay assembly of a headrest according to an exemplary embodiment.

The rear cover 40 corresponds to a "cover member" of the present disclosure, the front cover 20 corresponds to "another cover member" of the present disclosure, the trim 18 corresponds to a "covering material" of the present disclosure, and the lower bracket 62 corresponds to a "bracket" of the present disclosure. The sleeve 70 is assembled to the lower bracket 62, and the wire harness 90 is inserted through the sleeve 70. The wire harness 90 is a bundle of wires for supplying electric power and the like to the audio unit 14, and is routed from the inside of the headrest 10 to the inside of the non-illustrated seatback. As illustrated in FIG. 4 and FIG. 9, connectors 92, 94 are respectively attached to an upper end portion and a lower end portion of the wire harness 90. The connector 92 attached to the upper end portion of the wire harness 90 is connected to a non-illustrated connector of the audio unit 14. The connector 94 attached to the lower end portion of the wire harness 90 is connected to a connector attached to an upper end portion of another wire harness routed inside the seatback (none of these elements are illustrated in the drawings). Detailed explanation follows regarding the above configuration elements.

Figure 5:
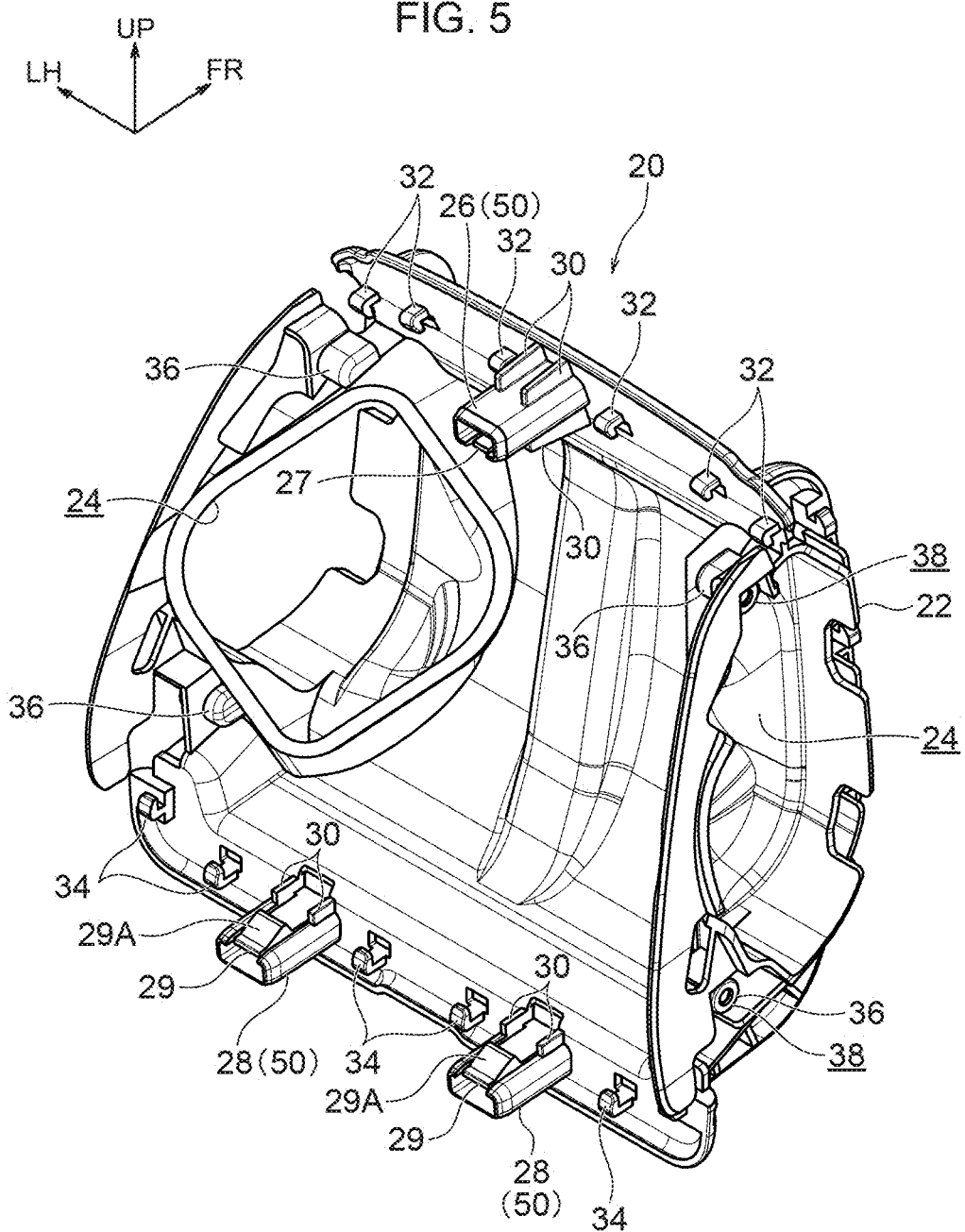
FIG. 5 is a perspective view illustrating a front cover of a headrest according to an exemplary embodiment.
Figure 6:
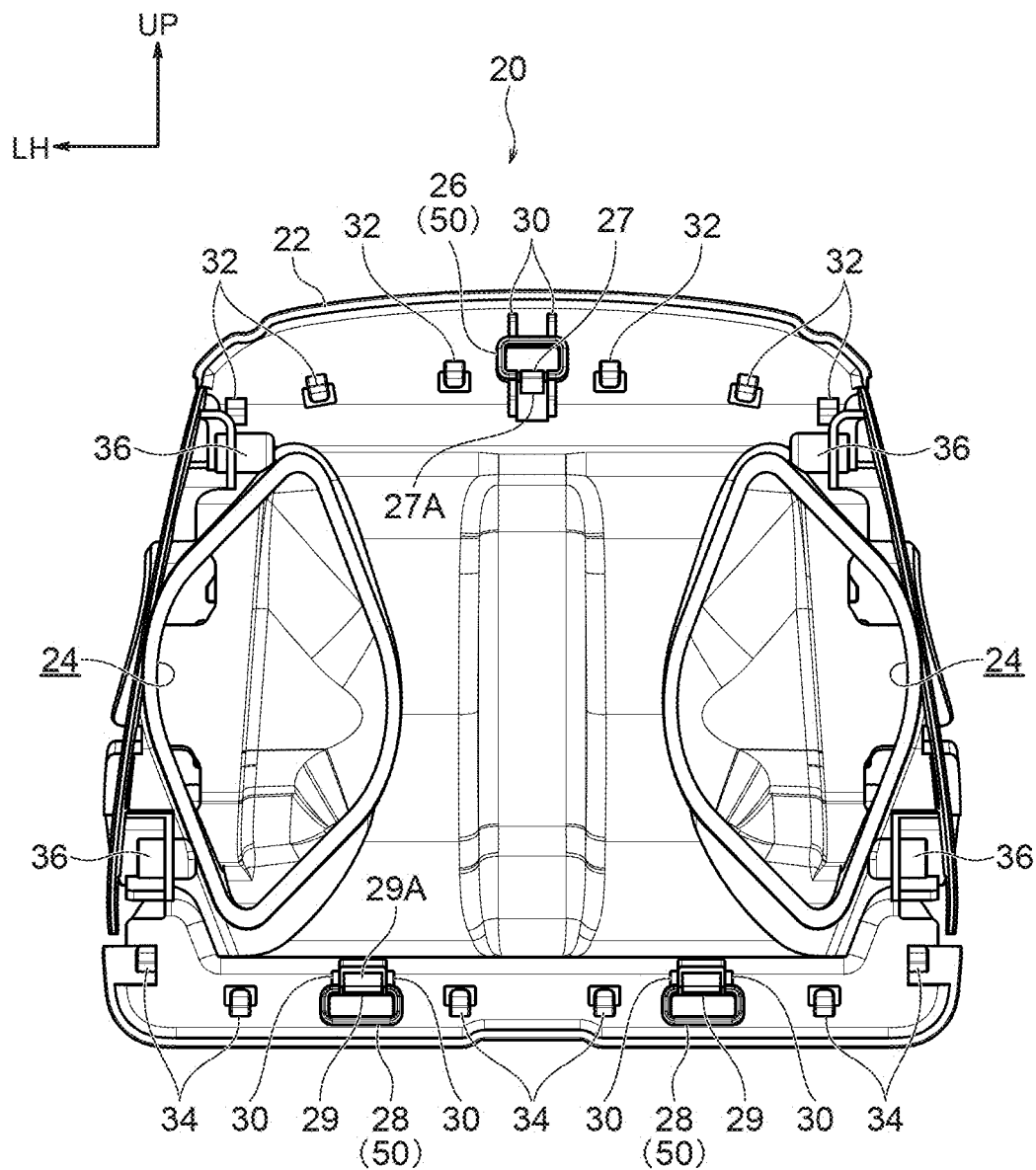
FIG. 6 is a back face view illustrating the front cover.

As illustrated in FIG. 5 and FIG. 6, the front cover 20 includes a front cover body 22 that is, as an example, a substantially box shaped molded resin component opening toward the rear side. The audio unit 14 is fitted inside the front cover body 22 from the rear side. Respective openings 24 are formed in left and right side sections of the front cover body 22. The openings 24 are disposed opposing the left and right speakers 16 of the audio unit 14. The speaker covers 16A of the left and right speakers 16 are respectively installed in left and right end portions of the front cover 20 with clip fittings or the like.

A single clip insertion portion 26 is formed to an upper end portion of the front cover body 22. Two clip insertion portions 28 arranged along the left-right direction are formed to a lower end portion of the front cover body 22. Each of the clip insertion portions 26, 28 is formed in a substantially angular tubular shape with its axial direction running in the front-rear direction, and projects rearward from the upper end portion or lower end portion of the front cover body 22. The clip insertion portion 26 formed to the upper end portion of the front cover body 22 is positioned at a left-right direction central portion of the front cover body 22. The left and right clip insertion portions 28 formed to the lower end portion of the front cover body 22 are formed at positions that have left-right symmetry about the left-right direction central portion of the front cover body 22. The clip insertion portions 26, 28 are aligned with respect to the rear cover 40.

A left-right direction central portion of a lower wall of the clip insertion portion 26 formed to the upper end portion of the front cover body 22 configures a flexible portion 27 that is capable of undergoing elastic deformation in the up-down direction. A downward-projecting protrusion 27A is formed at a leading end side of the flexible portion 27. A left-right direction central portion of an upper wall of each of the clip insertion portions 28 formed to the lower end portion of the front cover body 22 configures a flexible portion 29 that is capable of undergoing elastic deformation in the up-down direction. An upward-projecting protrusion 29A is formed at a leading end side of each of the flexible portions 29. A left and right pair of abutting ribs 30 are formed projecting out from left and right sides of an upper face of each of the clip insertion portions 26, 28. Each of the abutting ribs 30 has a plate shape with its plate thickness direction running in the left-right direction and its length running in the front-rear direction, and is formed at a base end side of the corresponding clip insertion portion 26, 28. The respective flexible portions 27, 29 and abutting ribs 30 are aligned with respect to the upper bracket 58 and the lower bracket 62.

Plural (six in this example) trim anchor clips 32 are formed arrayed along the left-right direction at the upper end portion of the front cover body 22. The plural trim anchor clips 32 project rearward from the upper end portion of the front cover body 22, and a leading end portion of each of the trim anchor clips 32 bends downward. Plural (six in this example) trim anchor clips 34 are formed arrayed along the left-right direction at the lower end portion of the front cover body 22. The plural trim anchor clips 34 project rearward from the lower end portion of the front cover body 22, and a leading end portion of each of the trim anchor clips 34 bends upward. The trim anchor clips 32, 34 are somewhat smaller than the clip insertion portions 26, 28. An upper end portion of the trim 18 is anchored to the trim anchor clips 32 formed to the upper end portion of the front cover body 22. A lower end portion of the trim 18 is anchored to the trim anchor clips 32 formed to the lower end portion of the front cover body 22.

An upper and lower pair of screw fastening portions 36 are respectively formed at upper and lower sides of each of the openings 24 formed in the left and right end portions of the front cover body 22. A threaded hole 38 that is open toward the corresponding left-right direction outer side is formed in each of the screw fastening portions 36. The respective screw fastening portions 36 are aligned with respect to the rear cover 40.

Figure 7:
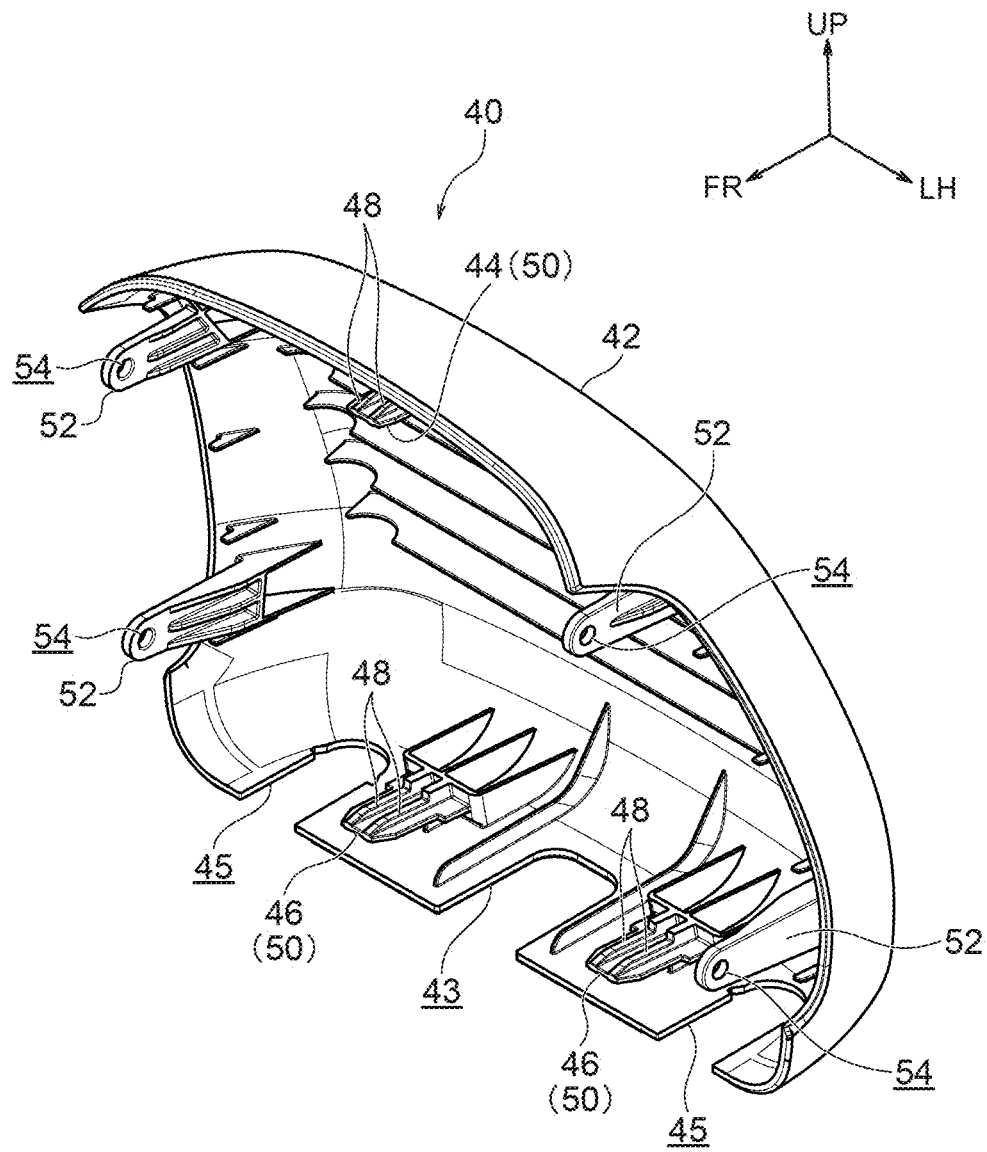
FIG. 7 is a perspective view illustrating a rear cover of a headrest according to an exemplary embodiment.
Figure 8:
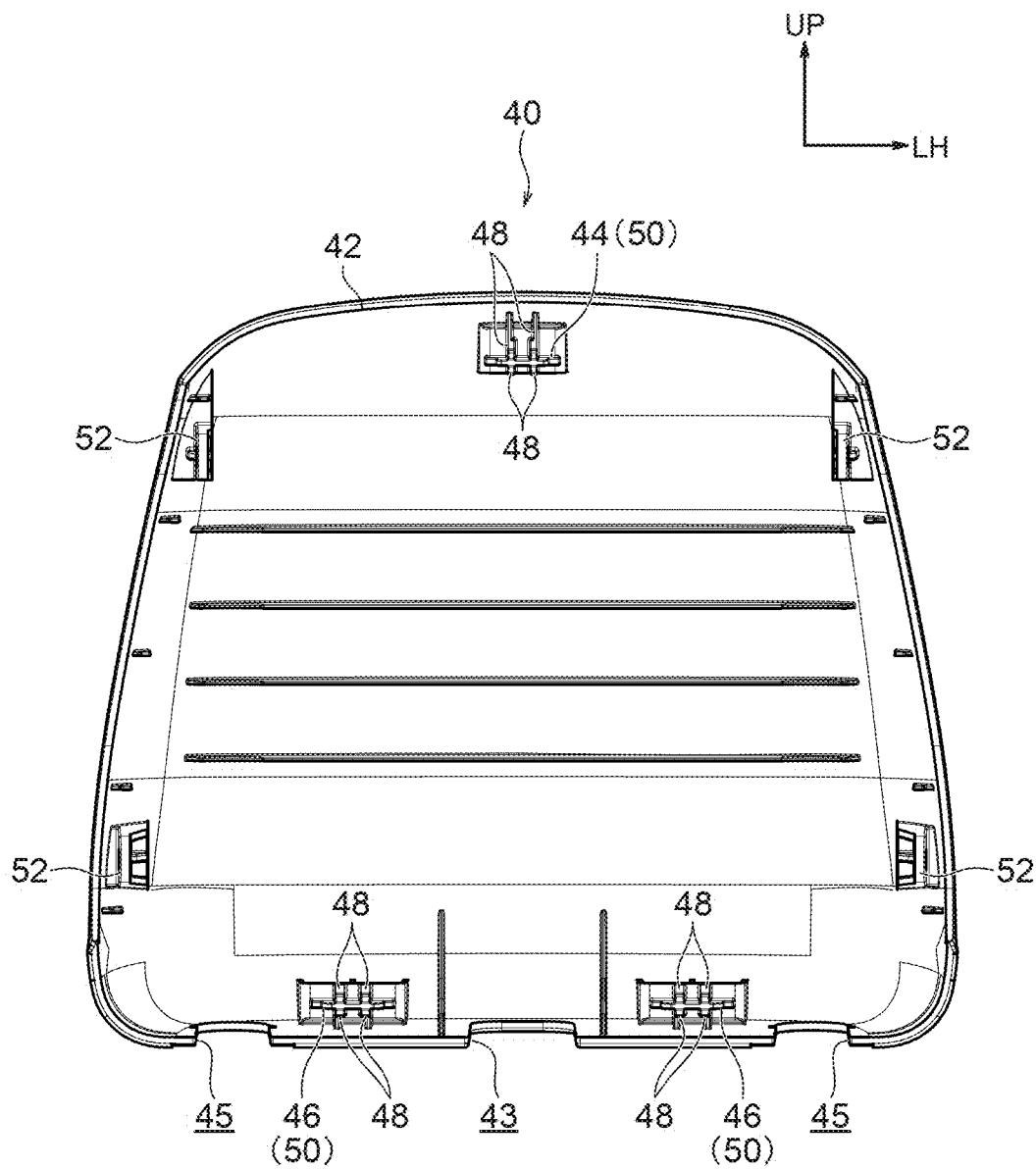
FIG. 8 is a front view illustrating the rear cover.

As illustrated in FIG. 7 and FIG. 8, the rear cover 40 includes a rear cover body 42 that is, as an example, a substantially box shaped molded resin component opening toward the front side. A set-back section 43 that is set back from the front side is formed in a central portion of a lower wall of the rear cover body 42. A left and right pair of leg set-back sections 45 that are likewise set back from the front side are formed in left and right side portions of the rear cover body 42. The set-back section 43 is aligned with respect to the sleeve 70, and the left and right leg set-back sections 45 are aligned with respect to the stay 56. Rubber covers 47 (see FIG. 3) made of rubber are respectively assembled to the left and right leg set-back sections 45. A circular through-hole 47A is formed in a rear portion of each of the rubber covers 47. A slit 47B that extends from a front end of the rubber cover 47 to the through-hole 47A is formed in a front portion of each of the rubber covers 47.

A single clip 44 is formed to an upper end portion at the inside of the rear cover body 42. Two clips 46 are formed to a lower end portion at the inside of the rear cover body 42. The respective clips 44, 46 are arranged inside the rear cover body 42 so as not to project forward beyond the rear cover body 42. The clip 44 formed to the upper end portion at the inside of the rear cover body 42 is positioned at a left-right direction central portion of the rear cover body 42. The left and right clips 46 formed to the lower end portion at the inside of the rear cover body 42 are formed at positions that have left-right symmetry about the left-right direction central portion of the rear cover body 42.

A base end side location of the clip 44 formed to the upper end portion of the rear cover body 42 has a substantially box shape opening toward the lower side, and is integrally joined to the rear cover body 42. A leading end side location of the clip 44 has a substantially plate shape with its plate thickness direction running in the up-down direction, and is disposed spaced apart from the rear cover body 42. A base end side location of each of the left and right clips 46 formed to the lower end portion of the rear cover body 42 has a substantially box shape opening toward the upper side, and is integrally joined to the rear cover body 42. A leading end side location of each of the clips 46 has a plate shape with its plate thickness direction running in the up-down direction, and is disposed spaced apart from the rear cover body 42. A leading end portion (front end portion) of each of the clips 46 is formed with a tapering shape with a decreasing left-right direction dimension on progression toward the front side. Both upper and lower faces of the leading end side location of each of the clips 44, 46 are formed with a left and right pair of projecting press-fit ribs 48. A leading end portion (front end portion) of each of the press-fit ribs 48 is formed with a tapering shape with a decreasing up-down direction height on progression toward the front side. The clips 44, 46 configure plural coupling sections 50 when combined with the clip insertion portions 26, 28 formed to the front cover 20 described previously.

An upper and lower pair of screw fastening tabs 52 are respectively formed at left and right end portions inside the rear cover body 42. Each of the screw fastening tabs 52 is formed in a plate shape with its length direction running in the front-rear direction and its plate thickness direction running in the left-right direction. A leading end portion of each of the screw fastening tabs 52 projects forward from the rear cover body 42. A screw hole 54 that penetrates the screw fastening tab 52 in the left-right direction is formed in the leading end portion of each of the screw fastening tabs 52.

Figure 10:
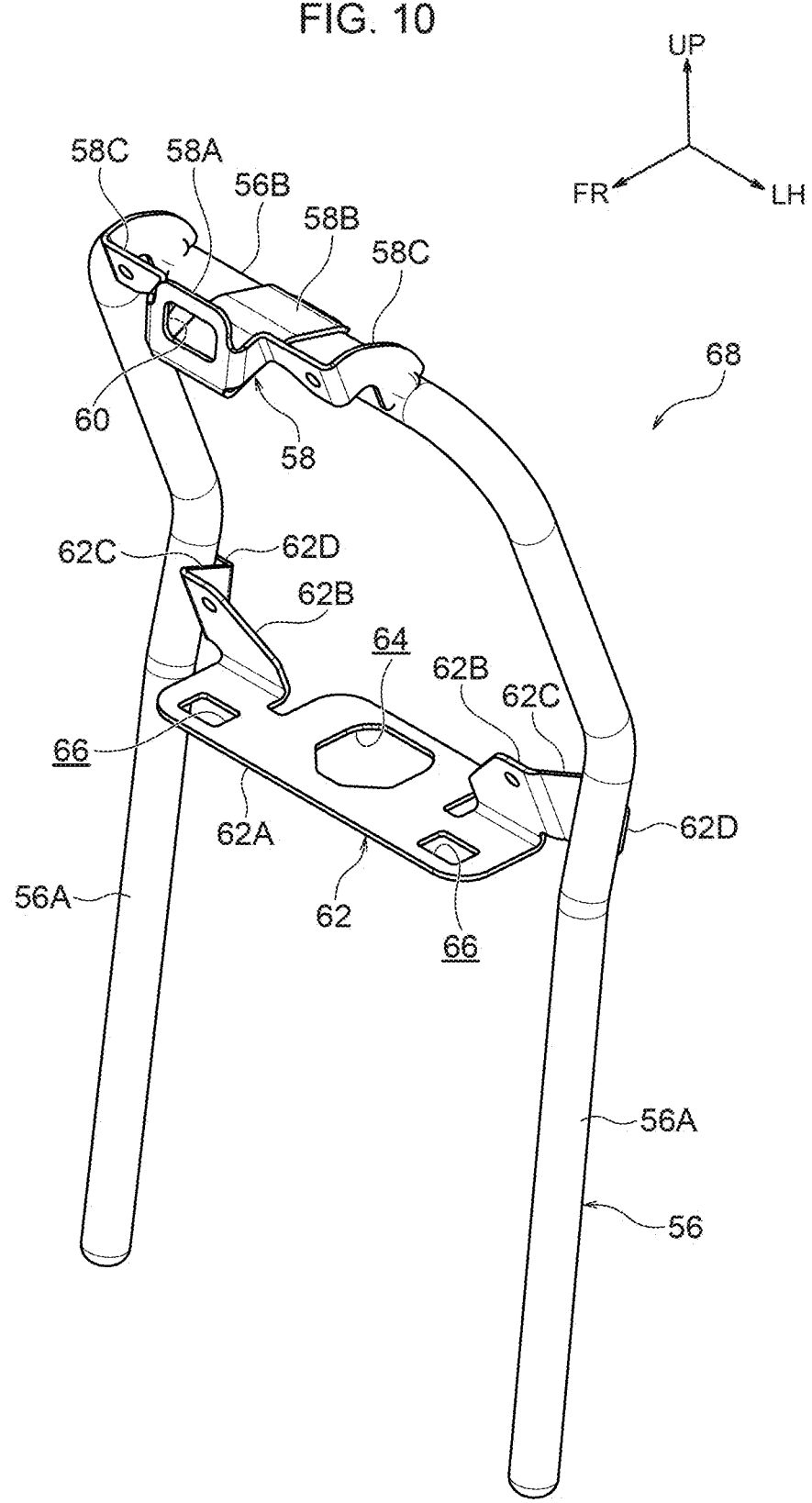
FIG. 10 is a perspective view illustrating the stay assembly.
Figure 11:
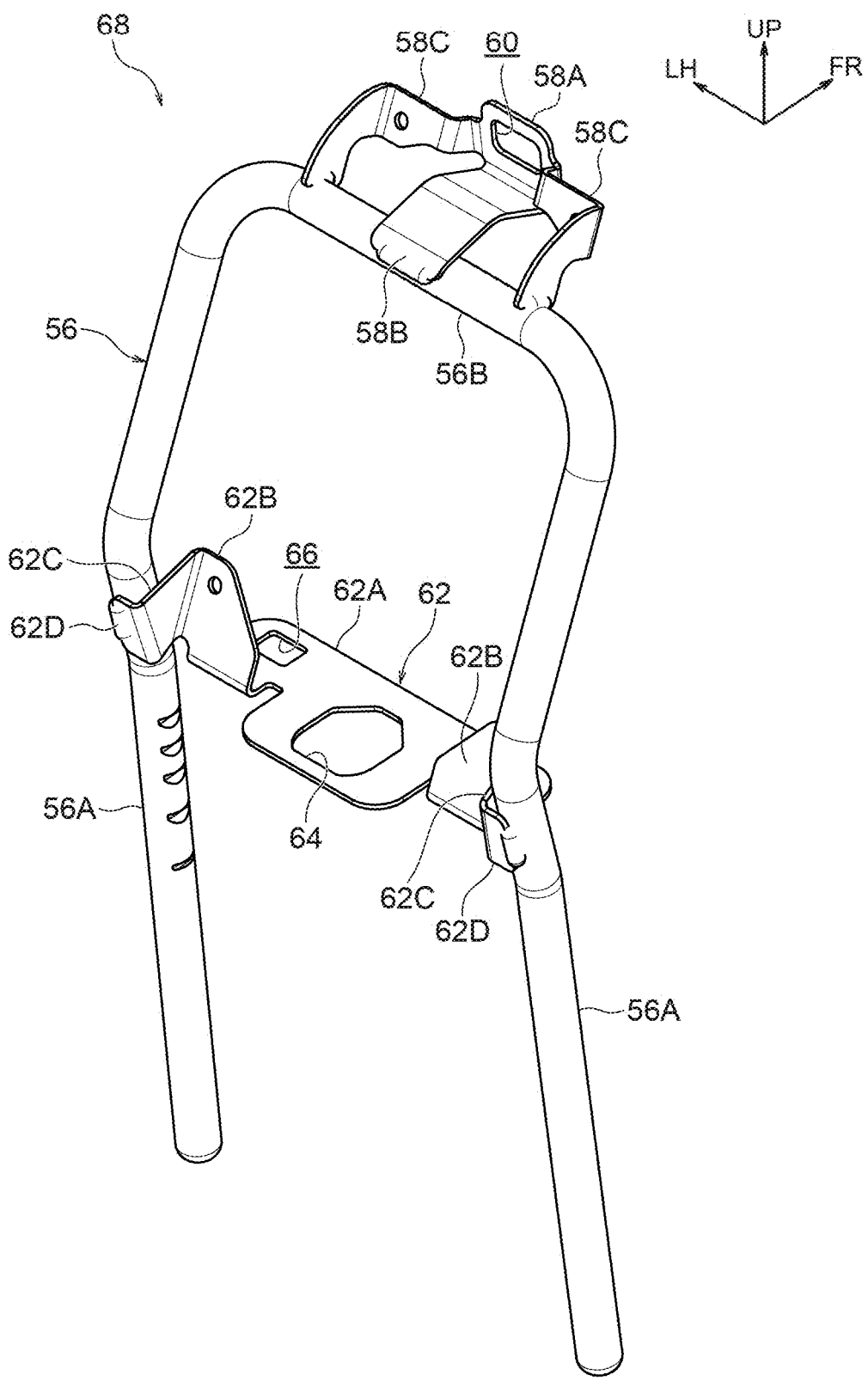
FIG. 11 is a perspective view illustrating the stay assembly.
Figure 12:
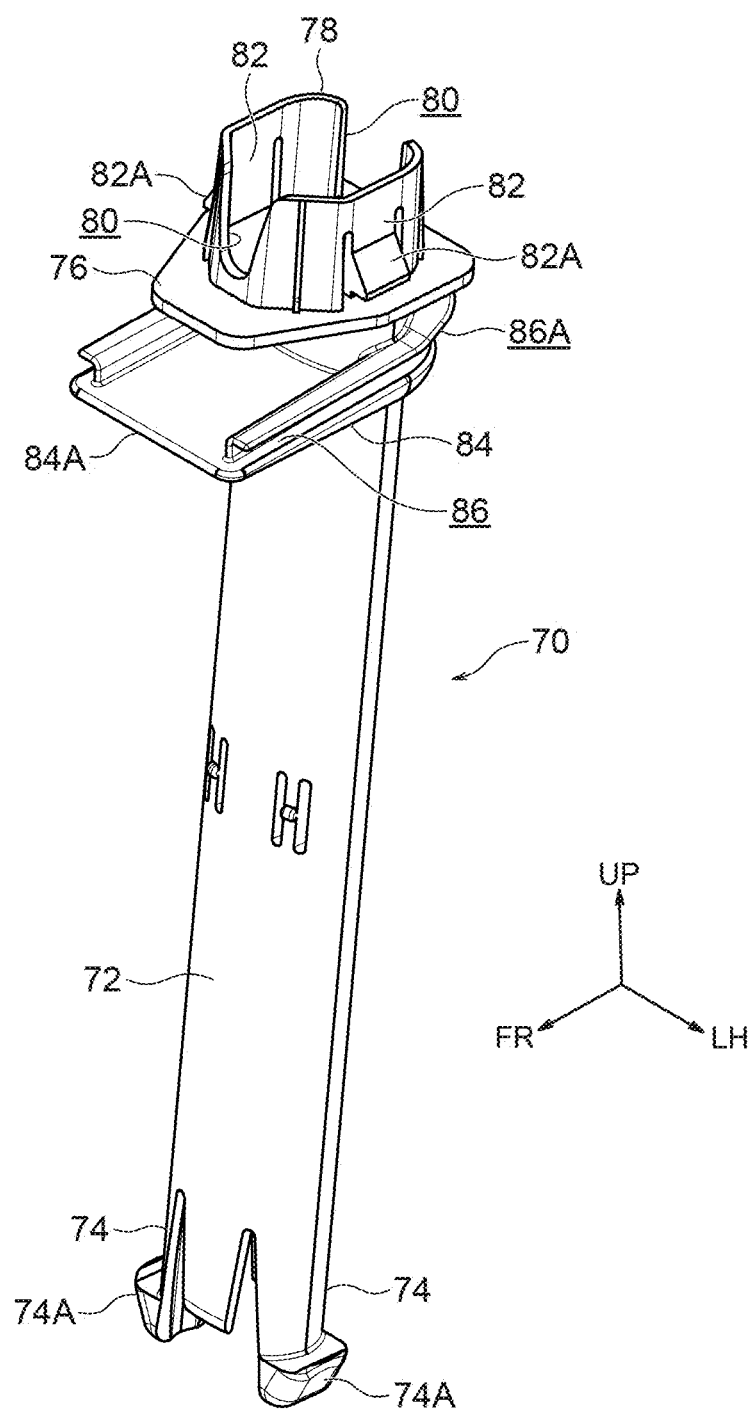
FIG. 12 is a perspective view illustrating the sleeve.
Figure 13:
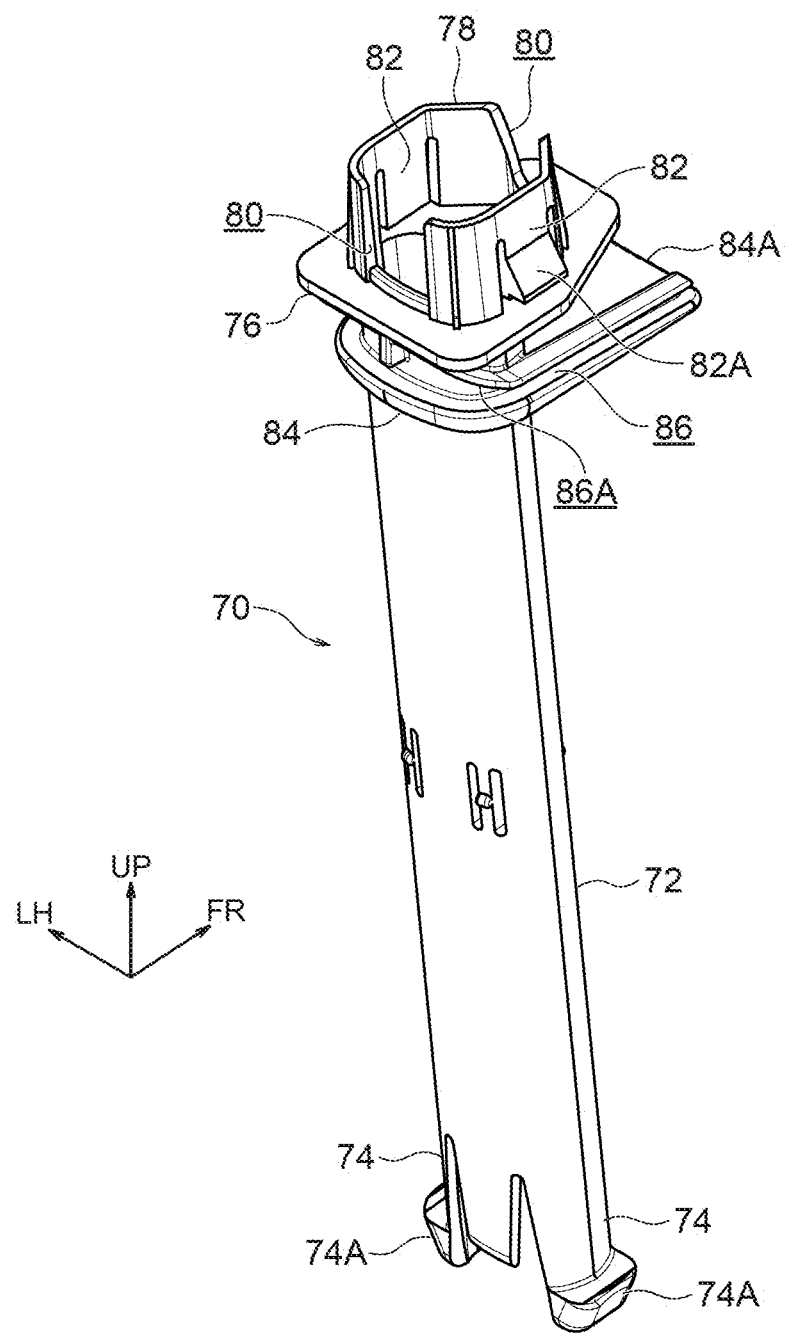
FIG. 13 is a perspective view illustrating the sleeve.
Figure 14:
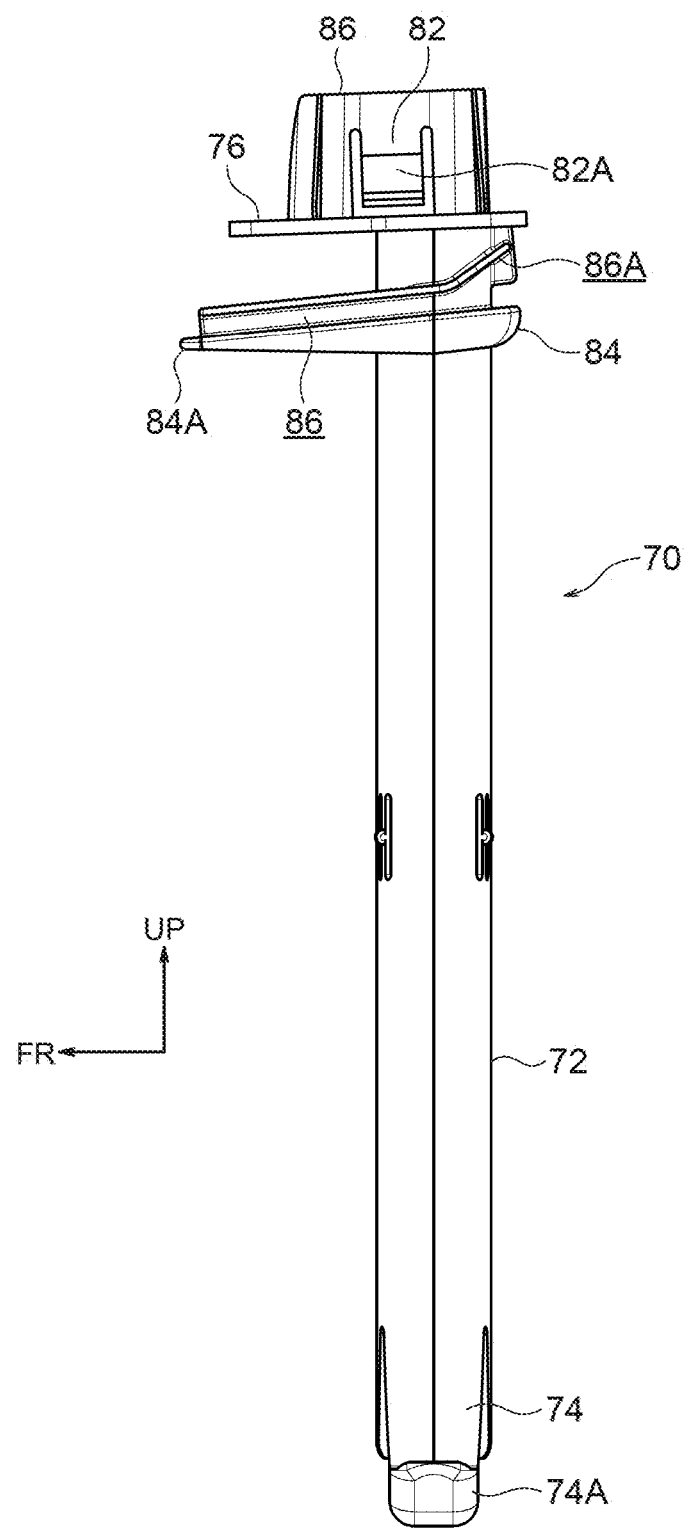
FIG. 14 is a side view illustrating the sleeve.
Figure 15:
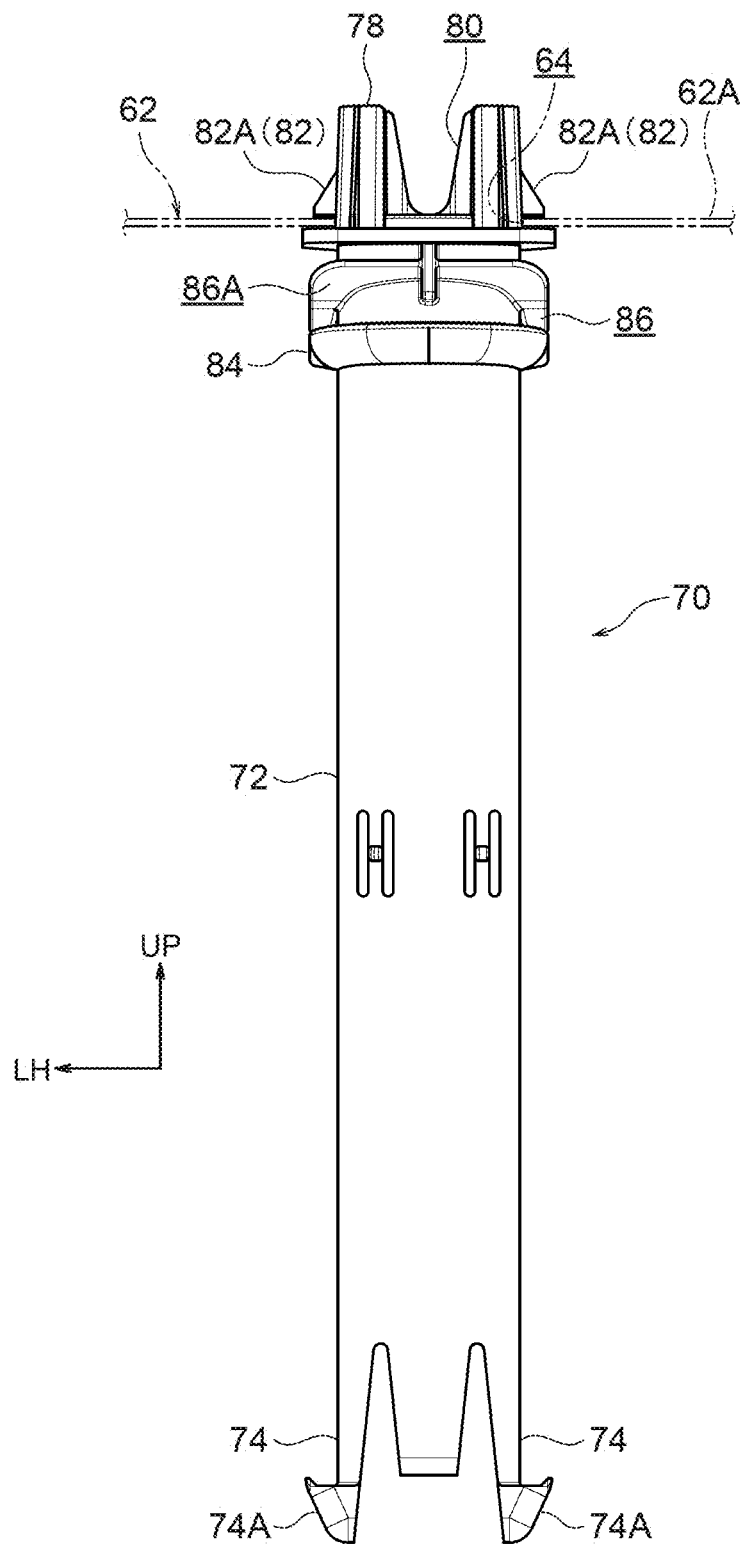
FIG. 15 is a back face view illustrating the sleeve.

As illustrated in FIG. 9 to FIG. 11, as an example, the stay 56 is manufactured by bending a metal tube so as to form an inverted, substantially U-shape as viewed along the front-rear direction. Specifically, the stay 56 is configured by a left and right pair of legs 56A that extend along the up-down direction and are arrayed in the left-right direction with a space therebetween, and a connecting portion 56B that connects upper end portions of the left and right legs 56A together in the left-right direction. The left and right legs 56A are supported by a left and right pair of headrest supports provided at the upper end portion of the non-illustrated seatback so as to allow height adjustment in the up-down direction. The upper bracket 58 and the lower bracket 62 are fixed to the stay 56 so as to configure a stay assembly 68.

As an example, the upper bracket 58 and the lower bracket 62 are each manufactured by bending a metal plate. Overall, the upper bracket 58 has an elongated shape with its length running in the left-right direction, and is fixed to an upper face of the connecting portion 56B. A front wall 58A with its plate thickness direction running in the front-rear direction is provided at a length direction central portion of the upper bracket 58. The front wall 58A is disposed offset toward the front side of the connecting portion 56B. A substantially rectangular through-hole 60 that penetrates the front wall 58A in the front-rear direction is formed in a central portion of the front wall 58A.

A lower wall 58B extends rearward from a lower end portion of the front wall 58A. The lower wall 58B has a plate shape with its plate thickness direction running in the up-down direction. A rear portion of the lower wall 58B contacts the upper face of the connecting portion 56B and is fixed to the connecting portion 56B by welding or the like. Left and right sidewalls 58C extend out from left and right end portions of the front wall 58A. Each of the left and right sidewalls 58C initially extends rearward from the corresponding left or right end portion of the front wall 58A, then bends toward the corresponding left-right direction outer side, and then bends rearward again at a leading end side so as to form a crank shape in plan view. A leading end portion of each of the left and right sidewalls 58C contacts the upper face of the connecting portion 56B and is fixed to the connecting portion 56B by welding or the like.

Overall, the lower bracket 62 has an elongated shape with its length running in the left-right direction, and is disposed between up-down direction intermediate portions of the left and right legs 56A. The lower bracket 62 includes a bracket body 62A with its length direction running in the left-right direction and its plate thickness direction running in the up-down direction. A left-right direction central portion of the bracket body 62A juts further rearward than both left-right direction side portions of the bracket body 62A. A substantially rectangular fitting hole 64 that penetrates the bracket body 62A in the up-down direction is formed in the left-right direction central portion of the bracket body 62A. Substantially rectangular through-holes 66 that penetrate the bracket body 62A in the up-down direction are respectively formed in the left and right direction side portions of the bracket body 62A. The left and right through-holes 66 are each formed smaller than the fitting hole 64.

Vertical walls 62B extend upward from left and right side portions of the bracket body 62A. Lateral walls 62C extend rearward from left-right direction outer end portions of the left and right vertical walls 62B. Fixing walls 62D extend toward the corresponding left-right direction outer side from rear end portions of the left and right lateral walls 62C. The left and right fixing walls 62D contact rear faces of the left and right legs 56A, and are fixed to the left and right legs 56A by welding or the like.

Figure 16:
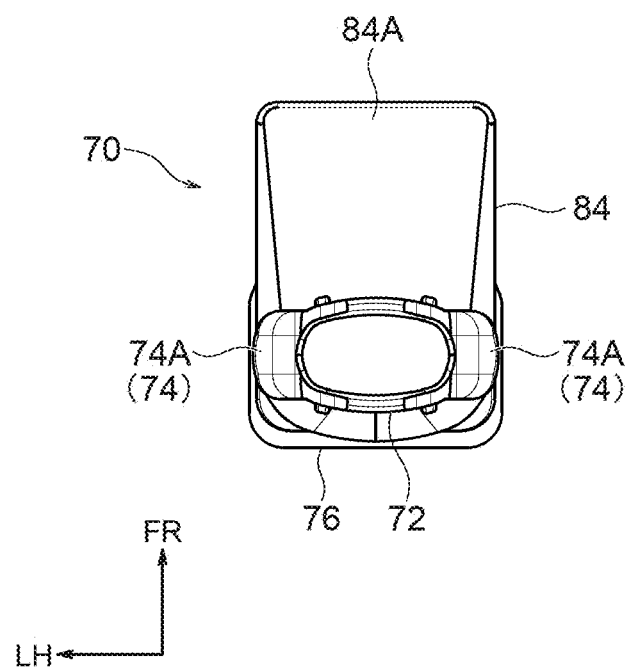
FIG. 16 is a lower face view illustrating the sleeve.

As illustrated in FIG. 12 to FIG. 16, the sleeve 70 includes a sleeve body 72 that is, as an example, an angular tubular shaped molded resin component with its axial direction running in the up-down direction. As illustrated in FIG. 16, a left-right direction dimension of the sleeve body 72 is set larger than a front-rear direction dimension thereof. A left and right pair of stopper portions 74 that are capable of undergoing elastic deformation toward the left-right direction center side are formed to a lower end portion of the sleeve body 72. A stopper clip 74A that projects toward the corresponding left-right direction outer side is formed to a lower end portion of each of the left and right stopper portions 74.

An upper end portion of the sleeve body 72 corresponds to "one end portion of the sleeve body" of the present disclosure. A collar-shaped flange 76 extends out from the upper end portion of the sleeve body 72. The flange 76 has a substantially rectangular shape in plan view, and juts out further toward the front side than toward both left-right direction sides and toward the rear side. A bracket-fitting section 78 extends toward the opposite side from the sleeve body 72 (i.e. extends upward) from the flange 76. The bracket-fitting section 78 is formed in a substantially angular tubular shape with its axial direction running in the up-down direction. The interior of the sleeve body 72 is in communication with the interior of the bracket-fitting section 78.

Set-back portions 80 that are set back from the upper side toward the lower side are respectively formed in a front portion and a rear portion of a peripheral wall configuring the bracket-fitting section 78. Anchor clips 82 that are capable of undergoing elastic deformation toward the left-right direction center side are respectively formed in a left portion and a right portion of the peripheral wall configuring the bracket-fitting section 78. The left and right anchor clips 82 are each separated from the peripheral wall by a U-shaped groove as viewed along the left-right direction, such that only upper end portions of the anchor clips 82 are joined to the peripheral wall. A protrusion 82A that projects toward the corresponding left-right direction outer side is formed to a lower portion of each of the left and right anchor clips 82.

A substantially collar shaped cover-fitting section 84 extends out from the sleeve body 72 on the opposite side of the flange 76 to the bracket-fitting section 78 (on the lower side in this example). The cover-fitting section 84 has a substantially rectangular shape in plan view, juts further toward the front side than toward both left-right direction sides and the rear side, and extends slightly further forward than the flange 76. A groove 86 that is open toward the left-right direction outer sides and the rear side is formed in both left-right direction end portions and a rear end portion of the cover-fitting section 84. A cover guiding portion 86A is formed at a rear portion of the groove 86 such that an up-down direction groove width of the groove 86 becomes enlarged toward the upper side on progression toward the rear side, thus configuring a tapering shape. The up-down direction groove width of a location of the groove 86 further forward than the cover guiding portion 86A decreases on progression toward the front side, thus configuring a tapering shape.

In assembly of the headrest 10 including the front cover 20, the rear cover 40, the stay assembly 68, the sleeve 70, and so on, first, for example, the sleeve 70 is assembled to the lower bracket 62 of the stay assembly 68. Specifically, the bracket-fitting section 78 of the sleeve 70 is fitted into the fitting hole 64 in the lower bracket 62 from below. During this fitting process, the protrusions 82A on the left and right anchor clips 82 provided at the bracket-fitting section 78 slide against hole edges of the fitting hole 64, and the left and right anchor clips 82 undergo elastic deformation toward the left-right direction center side (so as to approach each other).

As illustrated in FIG. 9, when the bracket-fitting section 78 is then fitted further into the fitting hole 64 until the flange 76 of the sleeve 70 contacts a lower face of the lower bracket 62, the left and right anchor clips 82 undergo elastic recovery toward the left-right direction outer sides, and the protrusions 82A on the left and right anchor clips 82 engage with (latch onto) the hole edges of the fitting hole 64 from the opposite side of the fitting hole 64 to the flange 76. The bracket-fitting section 78 is thereby prevented from coming out of the fitting hole 64, thus completing assembly of the sleeve 70 to the stay assembly 68. As illustrated in FIG. 9, the wire harness 90 is inserted through the sleeve 70.

Once the sleeve 70 has been assembled to the stay assembly 68 in the above manner, next, the front cover 20 is assembled to the stay assembly 68. Note that the audio unit 14 and the trim 18 are assumed to have been pre-assembled to the front cover 20 in a separate process, for example. In assembly of the front cover 20, the clip insertion portion 26 at the upper side of the front cover 20 is fitted through the through-hole 60 in the upper bracket 58 from the front side, and upper faces of the left and right clip insertion portions 28 at the lower side of the front cover 20 are overlaid on the lower face of the lower bracket 62. When this is performed, the respective protrusions 27A, 29A of the flexible portions 27, 29 provided at the clip insertion portions 26, 28 slide against the upper bracket 58 and the lower bracket 62, such that the flexible portions 27, 29 undergo elastic deformation.

Once the front cover 20 has been assembled to the stay assembly 68 as far as the assembly position illustrated in FIG. 4, the flexible portions 27, 29 then undergo elastic recovery. The protrusion 27A latches onto a hole edge of the through-hole 60 in the upper bracket 58 from the front side, and the protrusions 29A fit into the through-holes 66 in the lower bracket 62. When this occurs, the abutting ribs 30 of the clip insertion portion 26 abut the front wall 58A of the upper bracket 58 from the front side, and the abutting ribs 30 of the clip insertion portions 28 abut a front edge of the bracket body 62A of the lower bracket 62 from the front side. The front cover 20 is thereby assembled to the stay assembly 68, and the front cover 20 is supported by the stay 56 through the upper bracket 58 and the lower bracket 62.

Figure 17:
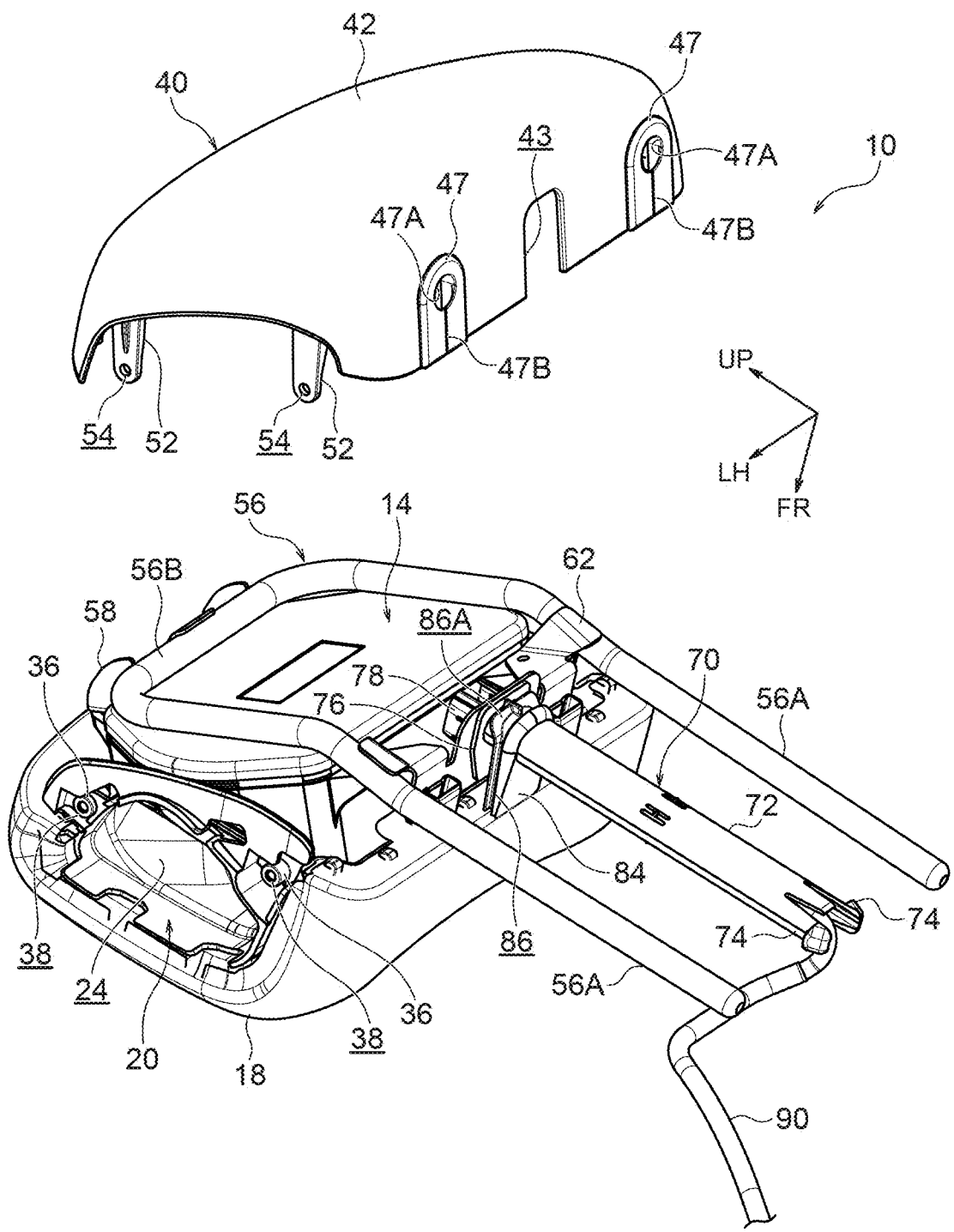
FIG. 17 is a first perspective view to explain assembly of a rear cover to a front cover.
Figure 18:
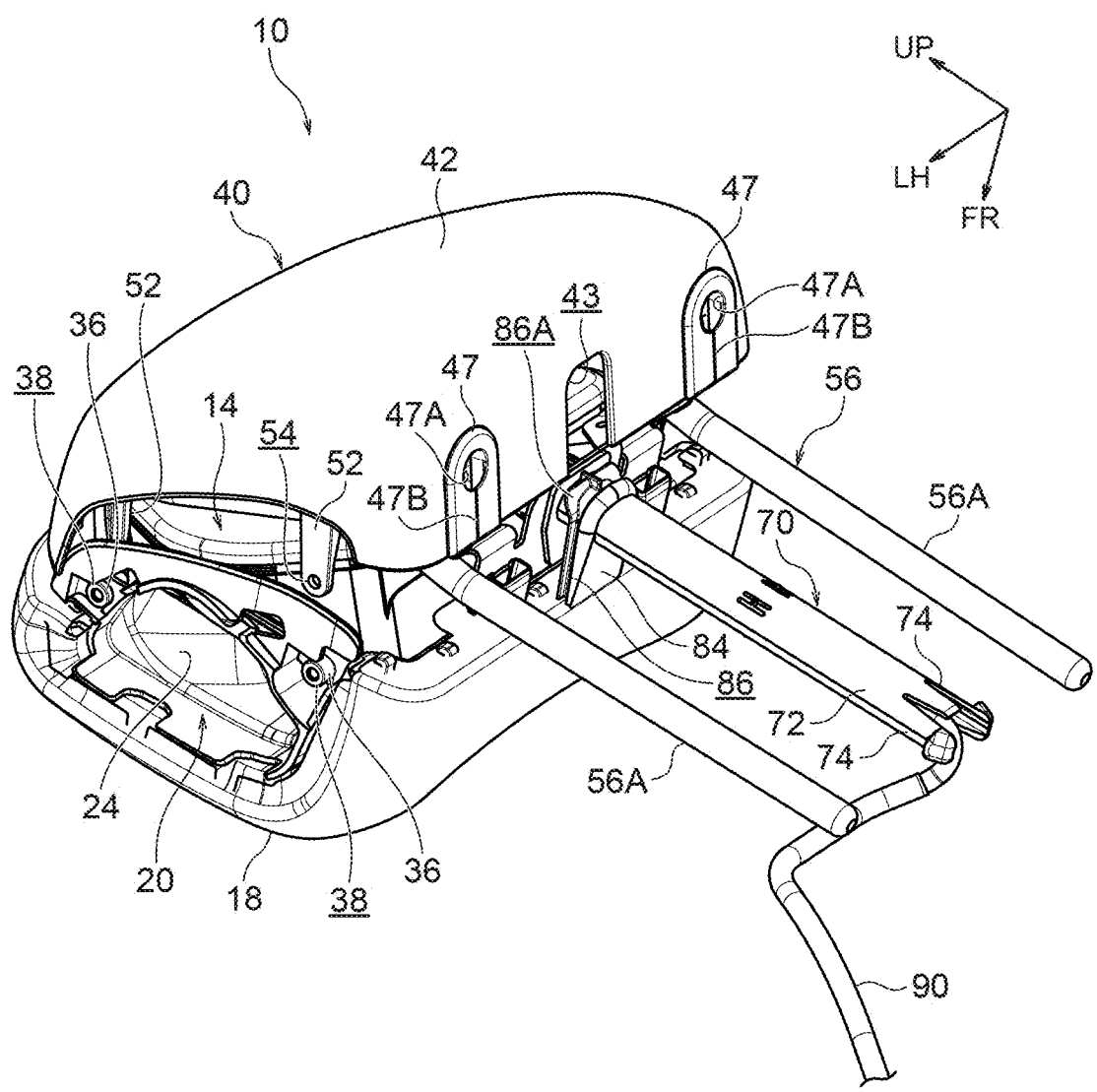
FIG. 18 is a second perspective view to explain assembly of a rear cover to a front cover

Once the front cover 20 is supported by the stay 56 in the above manner, next, the rear cover 40 is assembled to the front cover 20. In assembly of the rear cover 40, as illustrated in FIG. 17 and FIG. 18 for example, the rear cover 40 may be brought toward the front cover 20 from the rear side, and the upper side clip 44 inserted into the upper side clip insertion portion 26 (see FIG. 5 and FIG. 6) (the state in FIG. 18). Next, the set-back section 43 of the rear cover 40 and the cover-fitting section 84 of the sleeve 70 are fitted together. When this is performed, the edges of the set-back section 43 are fitted inside the cover guiding portion 86A of the groove 86 in the cover-fitting section 84, such that the edges of the set-back section 43 are guided into the groove 86. The groove 86 is formed in a tapering shape with a gradually decreasing groove width on progression toward the back of the groove 86 in the edge fitting direction (toward the front side in this example). Once the edges of the set-back section 43 have been fitted as far as the back of the groove 86, the edges are fitted together with the groove 86 without any play therebetween. While this fitting is being performed, the left and right legs 56A of the stay 56 are fitted into the respective through-holes 47A via the slits 47B in the left and right rubber covers 47. As illustrated in FIG. 3, in a state in which this fitting is complete, part of a seam 41 between the trim 18 and the rear cover 40 is concealed from below by a concealing portion 84A configuring a front end portion of the cover-fitting section 84.

By positioning and fitting together the set-back section 43 of the rear cover 40 and the cover-fitting section 84 of the sleeve 70 in the above manner, the left and right clips 44 formed to a lower end portion of the rear cover 40 are positioned so as to be capable of being inserted into the left and right clip insertion portions 28 formed at a lower end portion of the front cover 20. By fitting the edges of the set-back section 43 into the groove 86 in the cover-fitting section 84, the left and right clips 44 are guided into the left and right clip insertion portions 28. The front cover 20 and the rear cover 40 are thereby coupled together at the plural coupling sections 50.

In this coupled state, the screw holes 54 in the plural screw fastening tabs 52 provided to the rear cover 40 are arranged coaxially with the threaded holes 38 in the plural screw fastening portions 36 provided to the front cover 20. Non-illustrated screws are inserted through the respective screw holes 54, and these screws are screwed into the respective threaded holes 38. The screw fastening tabs 52 are thereby fixed to the respective screw fastening portions 36, and the front cover 20 and the rear cover 40 are prevented from separating from one another. Next, the left and right speaker covers 16A are installed in the left and right openings 24 in the front cover 20. The headrest 10 is thereby completed.

Operation and Advantageous Effects

Next, explanation follows regarding operation and advantageous effects of the present exemplary embodiment.

In the headrest 10 with the above configuration, the sleeve 70 is assembled to the lower bracket 62 that is fixed to the stay 56 that supports the main body 12 of the headrest 10. The sleeve 70 includes the sleeve body 72 that is formed in a tubular shape. The flange 76 extends in a collar shape from the upper end portion of the sleeve body 72. The flange 76 is disposed so as to contact the lower bracket 62 from below. The bracket-fitting section 78 extends out from the flange 76 toward the opposite side from the sleeve body 72. The bracket-fitting section 78 is fitted into the fitting hole 64 formed in the lower bracket 62 from below. The left and right anchor clips 82 are provided at the bracket-fitting section 78. These anchor clips 82 undergo elastic deformation followed by elastic recovery during the fitting process so as to engage with the lower bracket 62 from the opposite side from the flange 76 (i.e. from the upper side). The sleeve 70 is thereby assembled to the lower bracket 62. Assembly can be completed simply by performing the above fitting operation, rendering a screw fastening process unnecessary. This for example enables a reduction in manufacturing costs.

Moreover, the cover-fitting section 84 of the sleeve 70 extends out from the sleeve body 72 on the opposite side of the flange 76 from the bracket-fitting section 78. The cover-fitting section 84 is fitted together with the set-back section 43 formed in the rear cover 40 included in the main body 12 of the headrest 10. The sleeve 70 is thus supported at two locations by the rear cover 40 and the lower bracket 62, namely at the cover-fitting section 84 and the bracket-fitting section 78, thereby enabling the support strength provided at the sleeve 70 to be enhanced.

Moreover, the cover-fitting section 84 is formed with the groove 86 into which the edges of the set-back section 43 in the rear cover 40 are fitted. This enables the cover-fitting section 84 to be securely supported with respect to the rear cover 40.

Moreover, the groove 86 is formed in a tapering shape with a gradually decreasing groove width on progression toward the back of the groove 86 along the edge fitting direction of the set-back section 43. This enables play between the groove 86 (i.e. the cover-fitting section 84) and the edges of the set-back section 43 to be reduced or eliminated.

Moreover, in the sleeve 70, during coupling of the rear cover 40 of the main body 12 of the headrest 10 to the front cover 20 that is supported by the stay 56 of the headrest 10, the cover-fitting section 84 is fitted into the set-back section 43 in the rear cover 40. The rear cover 40 and the front cover 20 are coupled together at the plural coupling sections 50 arranged inside the headrest 10. Although this coupling operation is performed under circumstances in which the plural coupling sections 50 are difficult to see, the rear cover 40 and the front cover 20 are positioned with respect to each other as the cover-fitting section 84 and the set-back section 43 in the rear cover 40 are being fitted together. This enables the coupling of the plural coupling sections 50 to be guided, thereby facilitating the coupling operation.

Moreover, in the sleeve 70, the cover-fitting section 84 that is fitted together with the set-back section 43 in the rear cover 40 includes the concealing portion 84A. The concealing portion 84A conceals part of the seam 41 (see FIG. 3) between the trim 18 laid over the front cover 20 and the rear cover 40 from below. This enables a high quality finish to be obtained at the seam 41.

Although a configuration has been described in which the cover-fitting section 84 includes the concealing portion 84A in the above exemplary embodiment, there is no limitation thereto. A configuration may be employed in which the cover-fitting section 84 does not include the concealing portion 84A.

Although a configuration has been described in which the main body 12 of the headrest 10 includes the front cover 20 and the rear cover 40 in the above exemplary embodiment, there is no limitation thereto. The configuration of the main body 12 may be modified as appropriate.

Although a configuration has been described in which the edges of the set-back section 43 in the rear cover 40 are fitted into the groove 86 formed in the cover-fitting section 84 in the above exemplary embodiment, there is no limitation thereto. For example, a portion of the cover-fitting section 84 for fitting together with the set-back section 43 may be formed with a stepped profile.

Although a configuration has been described in which the sleeve 70 includes the cover-fitting section 84 in the above exemplary embodiment, there is no limitation thereto. A configuration may be employed in which the sleeve 70 does not include the cover-fitting section 84.

Although a configuration has been described in which the audio unit 14 configuring an electrical device is installed in the main body 12 of the headrest 10 in the above exemplary embodiment, there is no limitation thereto. For example, a configuration may be employed in which a headrest monitor is installed in the main body 12 of the headrest 10.

Various other modifications may be implemented within a range not departing from the spirit of the present disclosure. Obviously the scope of rights of the present disclosure is not limited to the above exemplary embodiment.

What is claimed is:

1. A headrest sleeve for assembly to a bracket fixed to a stay for supporting a main body of a headrest, the headrest sleeve comprising:
   a sleeve body formed in a tubular shape;
   a collar-shaped flange extending from one end portion of the sleeve body and disposed so as to be capable of contacting the bracket;
   a bracket-fitting section extending from the flange toward an opposite side from the sleeve body and configured to be capable of being fitted into a fitting hole formed in the bracket; and
   an anchor clip provided at the bracket-fitting section and configured to undergo elastic deformation and elastic recovery during the fitting of the bracket-fitting section into the fitting hole so as to engage with the bracket from an opposite side from the flange.

2. The headrest sleeve of claim 1, further comprising:
   a cover-fitting section extending from the sleeve body on an opposite side of the flange from the bracket-fitting section,
   wherein the cover-fitting section is configured to be capable of fitting together with a set-back section formed in a cover member included in the main body.

3. The headrest sleeve of claim 2, wherein the cover-fitting section is formed with a groove into which an edge of the set-back section is fitted.

4. The headrest sleeve of claim 3, wherein the groove is formed in a tapering shape such that a groove width of the groove gradually decreases on progression toward a back side of the groove in a fitting direction of the edge of the set-back section.

5. The headrest sleeve of claim 2, wherein:
   the main body includes another cover member that is supported by the stay; and
   the cover member is coupled to the other cover member by a plurality of coupling sections arranged inside the headrest, and the cover-fitting section is fitted together with the set-back section during the coupling.

6. The headrest sleeve of claim 2, wherein:
   the main body includes:
   another cover member that is supported by the stay and to which the cover member is coupled, and
   a covering material that is laid over the other cover member; and
   the cover-fitting section includes a concealing portion that hides part of a seam between the covering material and the cover member.

7. The headrest sleeve of claim 1, wherein:
   the bracket includes a bracket body with a plate thickness direction running in an up-down direction of the headrest; and
   the bracket-fitting section is fitted into the fitting hole that penetrates the bracket body in the up-down direction.

8. The headrest sleeve of claim 1, wherein:
an audio unit including left and right speakers is built into the main body of the headrest;
left and right speaker covers configure a styling face on left and right sides of the main body; and
a wire harness configured to supply electrical power to the audio unit is inserted through the sleeve body.

9. The headrest sleeve of claim 1, wherein:
the anchor clip is separated from a peripheral wall of the bracket-fitting section by a groove that forms a U-shape as viewed along a left-right direction of the headrest; and
an upper end portion of the anchor clip is joined to the peripheral wall.

10. A headrest comprising:
a stay to which a bracket is fixed;
a main body supported by the stay; and
the headrest sleeve of claim 1 assembled to the bracket.

11. The headrest of claim 10, wherein:
the headrest sleeve further includes a cover-fitting section extending from the sleeve body on an opposite side of the flange from the bracket-fitting section; and
the cover-fitting section is configured to fit together with a set-back section formed in a cover member included in the main body.

12. The headrest of claim 11, wherein the cover-fitting section is formed with a groove into which an edge of the set-back section is fitted.

13. The headrest of claim 12, wherein the groove is formed in a tapering shape such that a groove width of the groove gradually decreases on progression toward a back side of the groove in a fitting direction of the edge of the set-back section.

14. The headrest of claim 11, wherein:
the main body includes another cover member that is supported by the stay; and
the cover member is coupled to the other cover member by a plurality of coupling sections arranged inside the headrest, and the cover-fitting section is fitted together with the set-back section during the coupling.

15. The headrest of claim 11, wherein:
the main body includes:
another cover member that is supported by the stay and to which the cover member is coupled, and
a covering material that is laid over the other cover member; and
the cover-fitting section includes a concealing portion that hides part of a seam between the covering material and the cover member.

16. The headrest of claim 10, wherein:
the bracket includes a bracket body with a plate thickness direction running in an up-down direction of the headrest; and
the bracket-fitting section of the headrest sleeve is fitted into the fitting hole that penetrates the bracket body in the up-down direction.

17. The headrest of claim 10, wherein:
an audio unit including left and right speakers is built into the main body, and left and right speaker covers configure a styling face on left and right sides of the main body; and
a wire harness configured to supply electrical power to the audio unit is inserted through the sleeve body of the headrest sleeve.

18. The headrest of claim 10, wherein:
the anchor clip of the headrest sleeve is separated from a peripheral wall of the bracket-fitting section by a groove that forms a U-shape as viewed along a left-right direction of the headrest; and
an upper end portion of the anchor clip is joined to the peripheral wall.

* * * * *